United States Patent [19]

Reitsema

[11] Patent Number: 4,709,146

[45] Date of Patent: Nov. 24, 1987

[54] OPTICALLY COUPLED SHAFT ANGLE ENCODER

[75] Inventor: Harold J. Reitsema, Boulder, Colo.

[73] Assignee: Ball Corporation, Muncie, Ind.

[21] Appl. No.: 656,925

[22] Filed: Oct. 2, 1984

[51] Int. Cl.[4] .............................................. G01D 5/34
[52] U.S. Cl. ......................... 250/231 SE; 250/237 G
[58] Field of Search ............. 250/231 SE, 237 G, 230; 356/395; 340/347 P

[56] References Cited

U.S. PATENT DOCUMENTS

| | | | |
|---|---|---|---|
| 2,685,083 | 7/1954 | Beman | 250/231 SE |
| 3,384,754 | 5/1968 | Albarda | 250/237 G |
| 3,577,000 | 5/1971 | Warner | 250/231 SE |
| 3,940,609 | 2/1976 | Johnstun | 250/231 SE |
| 4,064,435 | 12/1977 | Stebbins | 340/347 P |
| 4,348,939 | 9/1982 | Hipp | 250/231 SE |
| 4,406,946 | 9/1983 | Osani | 356/395 |
| 4,521,875 | 6/1985 | Harrington | 250/231 SE |
| 4,549,808 | 10/1985 | Ernst | 250/237 G |

Primary Examiner—David C. Nelms
Attorney, Agent, or Firm—Gilbert E. Alberding

[57] ABSTRACT

An optically coupled shaft angle encoder for measuring the relative rotational angle of a shaft includes a mirror mounted on the shaft, a light source for transmitting light to the mirror and a linear array of photosensitive detectors for receiving light reflected by the mirror. The number and relative position of the photosensitive detectors of the array which actually receive reflected light is indicative of the angular position of the shaft.

15 Claims, 7 Drawing Figures

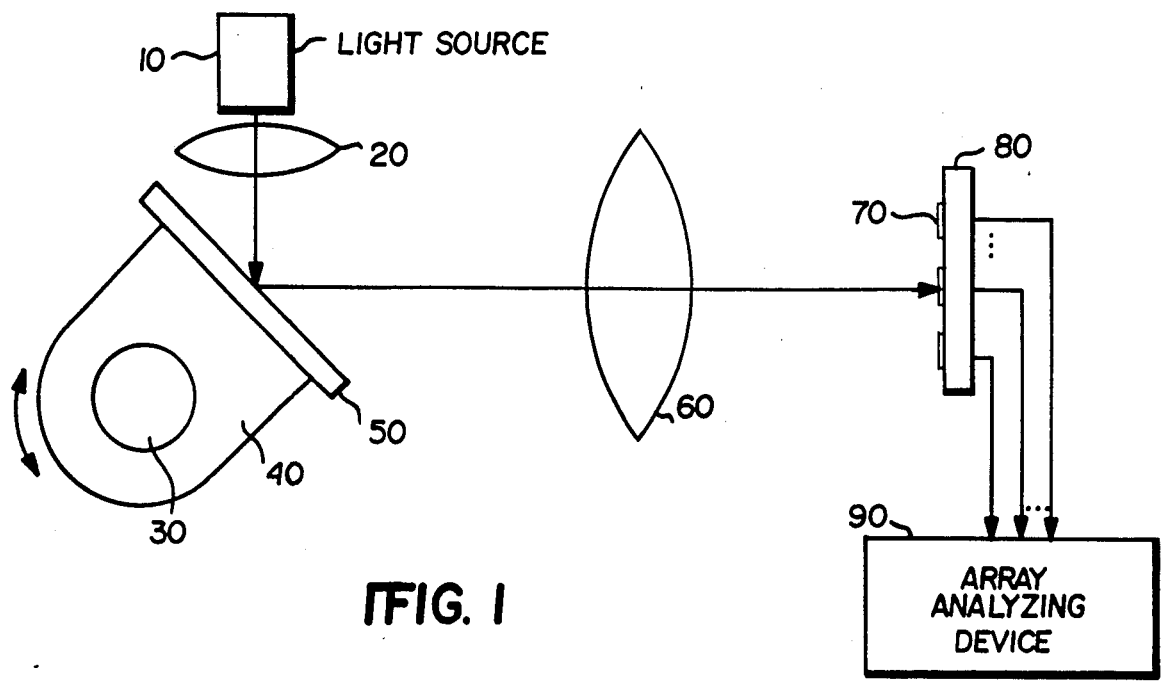
FIG. 1
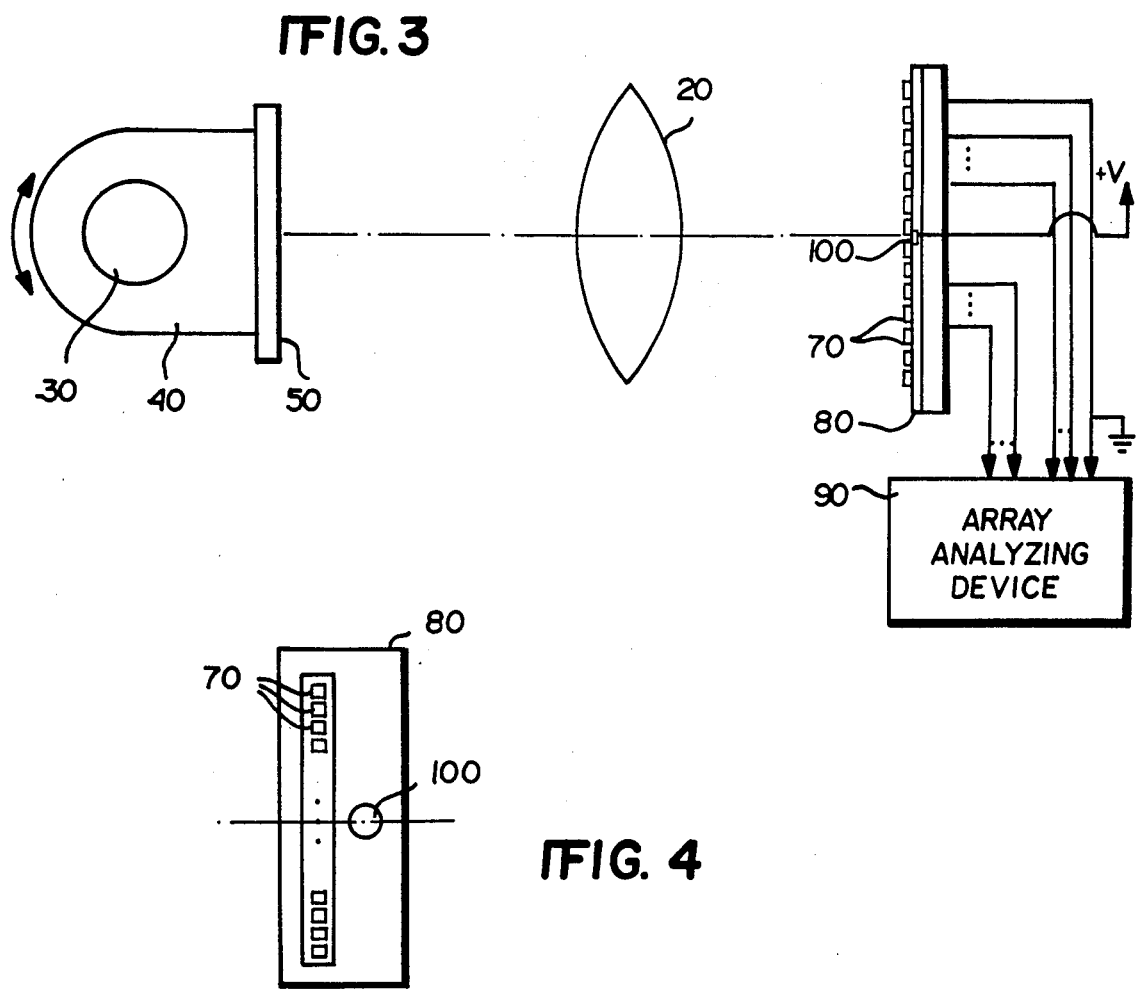
FIG. 3
FIG. 4

OPTICALLY COUPLED SHAFT ANGLE ENCODER

FIELD OF THE INVENTION

The invention relates to an optically coupled shaft angle encoder used for measuring the rotational angle of a rotatable shaft. Although generally useful as a shaft angle encoder, it may find especially useful application as a grating angle encoder for a spacecraft spectrometer.

BACKGROUND OF THE INVENTION

Prior art optical rotational angle encoders typically require large, precision encoder disks mounted on a shaft so that the pattern on the disk which rotates with the shaft can be sensed and decoded in order to determine the rotational position of the shaft. These devices, however, have drawbacks. For example, they must be precisely aligned because the pattern is often sensed by a single-element photo-detector.

Other devices in the prior art measure shaft rotation by electrically sensing the rotation of an auxiliary shaft, which is coupled to the shaft to be measured by gears, pulleys or chains with sprockets. These devices have a disadvantage in that they are mechanically coupled and thus drift out of alignment over time and are further disadvantageous in that the moving mechanical linkages do not work well in extreme environments, such as in remote space vehicle applica- tions.

Hipp, U.S. Pat. No. 4,348,939 proposes to use a light source and a planar mirror both fixedly attached to a rotatable shaft so that the light from the source and reflected by the relatively fixed mirror is reflected onto a linear photodetector array which is fixed with respect to the surrounding environment. By fixing the light source and mirror with respect to each other and with respect to the movable shaft, a minimum number of photodetectors are required in order to sense a given rotational movement of the shaft. Such an arrangement is disadvantageous, however, in that it is often difficult or undersirable to fixedly mount the light source and mirror to the rotating shaft to be measured. For example, a disadvantage results if the Hipp arrangement were attempted in a system where the temperature of the rotating shaft to be measured must be maintained very low (e.g. where the shaft may be associated with cryogenically cooled apparatus in a spacecraft), in that heat generated by the light source fixedly connected to the rotating shaft may have a thermal conductive path to undesired regions.

SUMMARY OF THE INVENTION

This invention provides an optically coupled shaft angle encoder where both the light source and the detector are mechanically de-coupled from any moving member. The only modification required for the moving or rotating member is the affixation of a suitable light reflective surface. Especially novel and advantageous forms of reflective surfaces and/or of the light source/detector are also employed.

In a first exemplary embodiment, diverging light from a point light source is collimated by a lens system to flood the surface of a reflecting element or mirror, which is rigidly attached to a rotable shaft. Light reflected by the mirror is passed into a second lens system whereupon it is focused onto a linear array of solid state photodetectors. The position of the light source image (e.g. a focused "point" of light) on the array is determined by the angle at which the light enters the focussing lens system. This angle changes at twice the rate of changes in the shaft angle of rotation. Output electrical signals from the detector array may then be input to a conventional array analyzing device which may determine the rotational position or movement of the shaft by well known techniques.

A number of modifications to the first embodiment can extend the effective range of the device when the shaft has rotated by an amount which exceeds one-half the field of view of the lens system/detectors. For example, a first modification uses additional light sources, the exact location of which is unimportant if they are spaced apart by less than one-half the field of view (since relative fixed positions can be measured after manufacture of the system). A second modification uses a multi-faceted reflecting device which more completely encircles the shaft whose rotation angle is to be measured. A third modification uses a non-flat reflector to reduce the travel of the reflected light along the array with respect to a given angular motion of the shaft. A fourth modification uses additional detectors and/or lens systems.

The light source of the invention in the preferred embodiment should be imaged so that it simultaneously illuminates several of the photosensitive detectors in the array. In this way the centroid of the area of a multi-element section of the array which is illuminated can be determined to thereby obtain a more accurate and/or higher resolution determination of the precise location of the imaged light along the array. This criteria sets an upper limit on the size of the light source which will, in any event, be set by required instrument sensitivity if nothing else. The light from the light source should be monochromatic (in a limited spectral range) to avoid chromatic aberrations.

The invention senses shaft rotation angle by measuring the deflection of a light beam and comprises a system in which the light source as well as the light detector is decoupled from the reflecting element. Accordingly, the invention uses a totally non-contacting technique, unlike prior mechanically coupled techniques, and does not require a large encoded disk, as do some prior art systems. The invention is simple in arrangement in that it requires only a reflecting surface attached to the moving shaft, in order to measure the rotational angle of the shaft. Furthermore, the arrangement of the invention using photosensitive detectors and signal processing techniques does not require highly precise alignment typically required by prior art devices. In addition, because the device has no moving mechanical linkages, it will operate well in extreme environments.

The invention further provides greater sensitivity in the measurement of the shaft rotational angle, because the angle of incidence, to the reflecting surface, combined with the similar angle of reflection, from the reflecting surface, result in relative movement along the array of photodetectors which is double that of the movement along Hipp's photodetector array. Although, this arrangement will require approximately twice as many photodetectors in the array for a given measurement range, it is nevertheless advantageous when used in systems which require highly precise and accurate measurement. The invention is therefore most advantageously used when shaft rotation rates are low and when the shaft moves over a limited range of angles although it is also more generally useful.

Thus, the compact, non-contacting arrangement of the invention is capable of working at very low temperatures without transferring heat to the shaft under measurement and uses very little power. As mentioned above, the resulting image on the linear array may be processed with conventional analyzing techniques.

BRIEF DESCRIPTION OF THE DRAWINGS

FIG. 1 schematically depicts a first exemplary embodiment of the invention;

FIG. 3 schematically depicts a third exemplary embodiment of the invention;

FIG. 4 schematically depicts a cross-sectional view along line 4—4 of the photosensitive detector substrate in the FIG. 3 embodiment;

DETAILED DESCRIPTION OF EXEMPLARY EMBODIMENTS OF THE INVENTION

Figure 5:
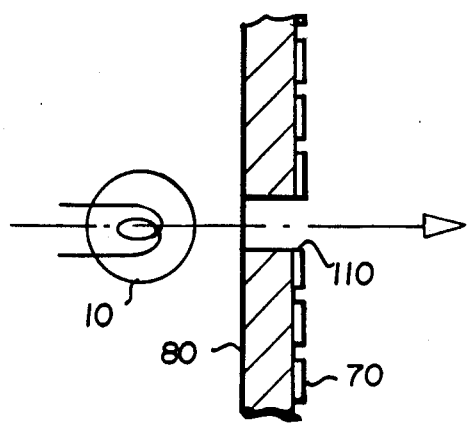
FIG. 5 schematically depicts an alternative photosensitive detector for use in the FIG. 3 embodiment.

FIG. 1 schematically depicts a first embodiment of the invention having a light source 10 and a lens system 20 for receiving diverging light from light source 10 and collimating the light so as to flood the surface of a reflecting element or mirror 50 with collimated light. The mirror 50 is carried by a mirror holder 40 which is rigidly mounted on a rotable shaft 30. The collimated light reflected from mirror 50 passes through a lens system 60, which focuses a "point" image of the collimated light onto a linear array of photosensitive detectors 70. The photosensitive detectors 70 are carried by a substrate 80 from which output signal lines are provided to an analyzing device 90.

When shaft 30 is rotated, light passing through the lens system 20 and reflected from mirror 50 through lens system 60 is caused to move along the array of photosensitive detectors 70 in a direction dependent upon whether shaft is turned in a clockwise or counterclockwise direction. Accordingly, rotational movement of the shaft 30 determines which photosensitive detectors 70 of the array will receive light generated from light source 10. The photosensitive detectors 70 are typically charge coupled devices (CCD) which output an electrical signal when light impinges upon them. Therefore, analyzing device 90 is able to sense which photosensitive detectors 70 are receiving light from light source 10. The particular pattern of photosensitive detectors which output signals to analyzing device 90 correspond to a particular angle through which shaft 30 has been rotated as should now be apparent. There are many known types of analyzers 90 that may be used. For example, there are known star-tracking devices wherein the position of a point image on a linear photodetector array is analyzed by determining the location of the image centroid along the array's length dimension. Once the centroid position is thus determined, it merely requires routine calibration procedure to convert this centroid position into a measurement of the angular position of shaft 30.

Although a collimating lens system 20 has been shown to be positioned between light source 10 and mirror 50, it should be clear that this lens system 20 can be dispensed with providing a suitable lens system 60 is provided. For example, without the lens system 20 light from light source 10 would be continually diverging even after reflection from the mirror 50. Accordingly, lens system 60 sould then be selected so as to receive diverging light and output converging or focused light (e.g. a "point" image) onto the array of photosensitive detectors. It should also be noted that lens systems 20 and 60, while being shown in the drawings for convenience as a single lens element, are not limited to single lens elements, but may comprise multiple elements as one of ordinary skill in the art will readily appreciate.

Figure 2:
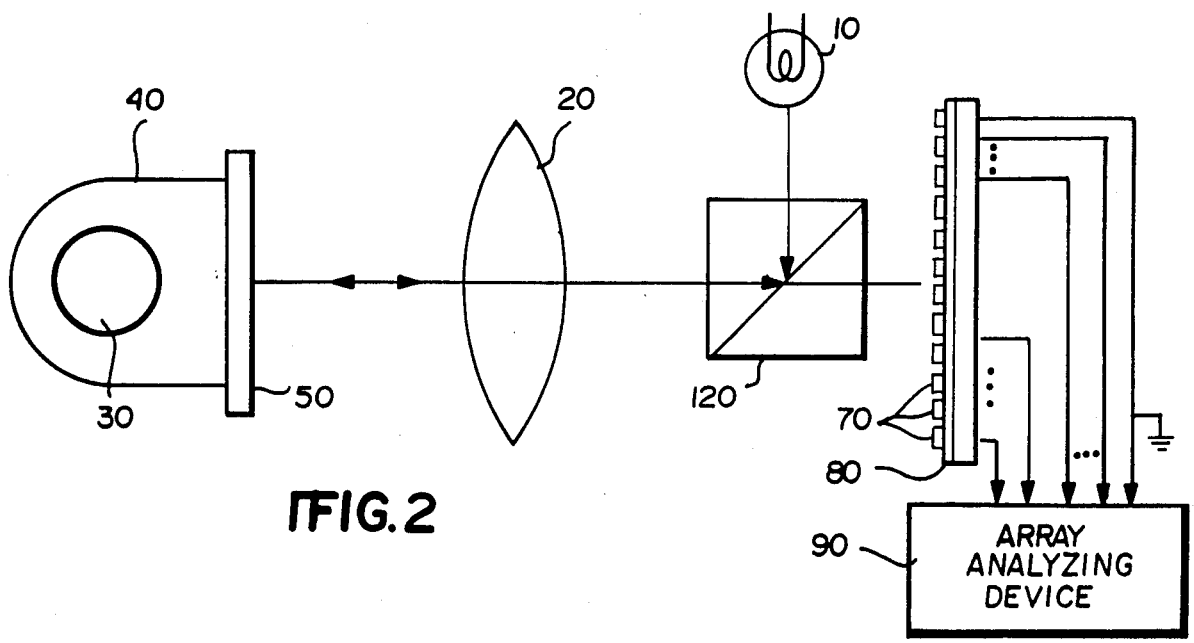
FIG. 2 schematically depicts a second exemplary embodiment of the invention.

A second embodiment shown in FIG. 2 incorporates a beam splitter 120 into the system. In this embodiment, light from light source 10 (which may typically be a light emitting diode) is reflected by the beam splitter 120 so as to pass through lens system 20. The lens system 20 converts the diverging reflected light from beam splitter 120 into collimated light which floods mirror 50. The collimated light reflected from mirror 50 is then focussed during its return path through lens system 20 onto the linear array of photosensitive detectors 70, insofar as it is transmitted through the beam splitter 120. Similar to the embodiment of FIG. 1, photosensitive detectors 70 provide output signals to a conventional array analyzing device in order that the rotational angle through which shaft 30 has been rotated can be determined.

A third exemplary embodiment of the present invention is shown in FIG. 3 to comprise a light source 100 such as, for example, a photodiode formed or otherwise disposed on the same substrate 80 which carries photosensitive detectors 70. The light source 100 and detector array are both at the focal plane of lens system 20, but each slightly offset to opposite sides of the optical axis. Thus when the mirror surface is perpendicular to the optical axis, the focussed image is nevertheless positioned correctly onto the linear detector array. The long dimension of the detector array is oriented so that rotation of the shaft will cause the focussed image of the light source to travel along its length. This arrangement is more clearly shown in FIG. 4 which is a cross-sectional view of the substrate 80 along the lines 4—4 of FIG. 3. In FIG. 4, the array of photosensitive detectors 70 is shown axially displaced from light source 100, which as mentioned above can be a photodiode. The diverging light from light source 100 is collimated by lens system 20 and reflected from mirror 50 whereupon it is focussed onto the array of photodetectors 70 when returning through lens system 20. Accordingly, similarly to the other embodiments described above, rotation of shaft 30 moves the light reflected from mirror 50 along the array, and the output signals from photosensitive detectors which receive the focused light from lens system 20 are input to analyzing device 90 which, as mentioned above, can decode the output signals to indicate the rotational angle through which the shaft has been rotated.

In FIG. 5 there is shown an alternative arrangement for the light source and detector array used in the embodiment of FIG. 3. FIG. 5 shows a more conventional light source 10, such as for example a common incandescent light source (although any other light source such as a photodiode could also be used) which is positioned behind the substrate 80. A pinhole 110 (e.g. about 0.001 to 0.002 inch in diameter) in the substrate 80 allows light from light source 10 to pass therethrough. The other operating characteristics of the system using a light source and detector array, such as that shown in FIG. 5, are the same as has already been described with respect to the FIG. 3 embodiment.

Figure 6:
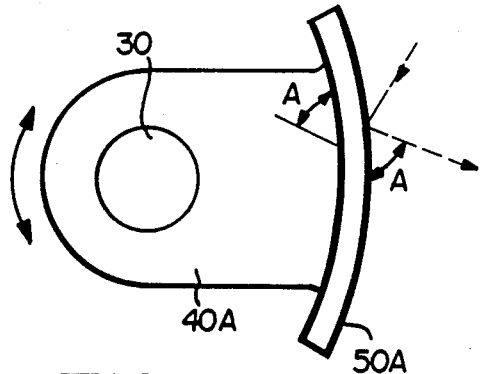
FIG. 6 schematically depicts an alternative curved reflecting surface for use in the FIG. 1, 2 and 3 embodiments.
Figure 7:
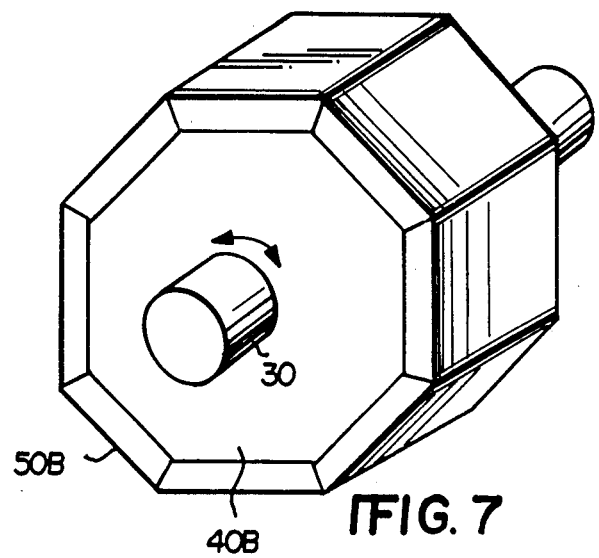
FIG. 7 schematically depicts an alternative mutli-faceted reflecting surface for use in the FIGS. 1, 2 and 3 embodiments.

FIGS. 6 and 7 illustrate alternative configurations for the reflecting elements or mirror in any of the embodiments and which allow a greater amount of shaft rotation to be detected and measured by a given system (i.e. an increased range of measurement is provided). In FIG. 6, mirror 50A is shown to have a curved surface which for a given rotation of shaft 30 reduces the amount of displacement of the light along the array of photosensitive detectors. The angle A determines the reduced motion ratio between angular shaft movement and the field of view angular movement. FIG. 7 shows a multi-faceted mirror 50B which is held by a mirror holder 40B so as to completely encircle the shaft 30. As one mirror's reflected image moves out of the field of view of the detector array, another subsequent facet provides another reflected image which then moves into the detector's field of view.

The analyzing device 90 provided in each of the above-described embodiments of the invention is able to determine the rotational angle through which the shaft has been rotated by use of any desired conventional array analyzing algorithm, as will be readily appreciated by those skilled in the art.

The overall accuracy of the system is determined by the detector lens system field of vision, the focal length of the system, the element size, spacing and overall length of the detector array and the resolution of the image centroiding algorithm used in the analyzer. If the algorithm is capable of measuring to ±1% of the pitch of the photosensitive detector elements (typically the detector elements may be on center lines spaced apart by 0.001 inch), then a 1,000 element detector with a 20° field of vision can resolve an angle of as little as 0.4 arc sec over a 10° range. With a 40° field of vision, an angle of 0.8 arc secs can be resolved using the same detector and other system parameters.

It should be appreciated that the above-described description of the preferred embodiments do not limit the scope of the present invention in any way, and that various changes and modifications may be made without departing from the spirit and scope of the present invention.

What is claimed is:

1. An optically coupled shaft angle encoder for measuring the rotational angle of a rotatable shaft, said encoder comprising:
   light source means with respect to which said shaft is also rotatable for generating light;
   reflecting means mounted on said shaft for receiving and reflecting said light therefrom;
   a linear array of photosensitive detectors fixedly mounted with respect to said light source means and disposed to receive said reflected light from said reflecting means, each detector providing a separate electrical output signal, wherein at least one but not all photosensitive detectors of said linear array receives said reflected light at a position along said linear array which depends on the relative angular position of said shaft; and
   an optical means, positioned between said light source and said reflecting means, for collimating light received from said light source before it is passed on to said reflecting means and said optical means also being positioned between said reflecting means and said array of photosensitive detectors, for focussing collimated light received from said relecting means onto said array.

2. An optically coupled shaft angle encoder as in claim 1 further comprising:
   analyzing means connected to receive the outputs of said detectors for determining the relative angular position of said shaft.

3. A device as claimed in claim 1, wherein said optical means comprises
   a first lens system, positioned between said light source and said reflecting means, for collimating light received from said light source before it is passed on to said reflecting means; and
   a second lens system, positioned between said reflecting means and said array of photosensitive detectors, for focussing collimated light received from said reflecting means onto said array.

4. A device as claimed in claim 1, wherein said reflecting means comprises a multi-faceted mirror mounted so as to at least partially encircle the shaft.

5. A device as claimed in claim 1, wherein said light source generating means comprises a photodiode.

6. A device as claimed in claim 1, wherein said linear array comprises a plurality of charge coupled devices.

7. A device as claimed in claim 1, further comprising:
   a beam splitter for reflecting light received from said light source towards said reflecting means; and
   a common lens system for receiving and collimating said reflected light from said beam splitter as it passes toward said reflecting means and for also passing the reflected light from said reflecting means back through said common lens system and said beam splitter before it is focused onto said array.

8. An optical shaft angle encoder for measuring the relative angle of a rotatable shaft, said encoder comprising:
   a light source;
   a reflector fixedly mounted on said shaft;
   a linear array of photosensitive detectors fixedly mounted on a substrate with respect to said light source, each detector providing a separate electrical output signal; and
   optical path means fixedly mounted with respect to said light source and said detectors for imaging light onto said linear array from said source which light is reflected from said reflector whereby the position of said imaged light on said linear array, which imaged light illuminates at least one but not all detectors, corresponds to the angular position of said shaft;
   said optical path means includes at least one optical lens fixedly positioned with respect to said light source and said array of photosensitive detectors for receiving and collimating light from said source before it is incident onto said reflector and for focusing collimated light reflected therefrom onto said linear array.

9. An optical shaft angle encoder as in claim 8 wherein said detector array is disposed on said substrate having an opening in its surface which allows light from said light source to pass therethrough.

10. An optical shaft angle encoder as in claim 8 further comprising:
   array analyzing means connected to said array for determining the angle of said shaft.

11. An optical shaft angle encoder as in claim 8, wherein said light source comprises a photodiode disposed on said substrate.

12. An optical shaft angle encoder as in claim 8, wherein said optical path means comprises a lens means positioned between said reflector and said array of photosensitive detectors.

13. An optical shaft angle encoder in claim 8, wherein said reflector comprises a multi-faceted mirror mounted so as to at least partly encircle the shaft.

14. An optical shaft angle encoder as in claim 8, wherein said light source comprises a photodiode.

15. An optical shaft angle encoder as in claim 8, wherein said array comprises a plurality of charge coupled devices.

* * * * *